United States Patent [19]

Ebbeson

[11] Patent Number: 5,343,717
[45] Date of Patent: Sep. 6, 1994

[54] REFRIGERATOR WITH INTERMITTENTLY WORKING SORPTION REFRIGERATING APPARATUS

[75] Inventor: Bengt E. O. Ebbeson, Ettenhausen, Switzerland

[73] Assignee: Aktiebolaget Electrolux, Sweden

[21] Appl. No.: 63,602

[22] Filed: May 19, 1993

[30] Foreign Application Priority Data

Jun. 9, 1992 [SE] Sweden .............................. 9201768-0

[51] Int. Cl.[5] ............................................ F25B 17/08
[52] U.S. Cl. ...................................... 62/481; 62/485; 62/146
[58] Field of Search ................... 62/480, 477, 481, 482, 62/106, 485, 143, 144, 146

[56] References Cited

U.S. PATENT DOCUMENTS

| 1,908,413 | 5/1933 | Elfving | 62/481 |
|---|---|---|---|
| 1,972,427 | 9/1934 | Normelli | 62/120 |
| 2,044,951 | 6/1936 | Munters | 62/480 |
| 2,340,886 | 2/1944 | Erland Af Kleen | 62/144 |
| 3,270,512 | 9/1966 | Webb | 62/144 |
| 4,164,128 | 8/1979 | Newton | 62/105 |
| 4,413,670 | 11/1983 | Ritter | 165/1 |
| 4,523,635 | 6/1985 | Nishizaki et al. | 165/104.12 |
| 5,024,064 | 6/1991 | Yonezawa et al. | 62/106 |
| 5,057,132 | 10/1991 | Lebrun et al. | 62/4 |

FOREIGN PATENT DOCUMENTS 2048513 10/1978 Fed. Rep. of Germany .
2489488 3/1982 France .

*Primary Examiner*—Henry A. Bennett
*Assistant Examiner*—William C. Doerrler
*Attorney, Agent, or Firm*—Pearne, Gordon, McCoy & Granger

[57] ABSTRACT

A refrigerator is provided with a refrigerating unit in the form of an apparatus having at least one pair of containers, where each pair includes a first and a second container (18 and 20, respectively) communicating with each other through a pipe (22). Each container contains a substance which, when being heated, gives off a gaseous working medium and, when being cooled, absorbs the gaseous working medium. The first container (18) is arranged to be heated from the storage compartment (16) of the refrigerator, which compartment thereby is cooled. The second container (20) is provided with a heater (34). Each container is provided with an arrangement for, when need arises, conducting heat away from the respective container, which arrangement includes a cooling circuit (26, 28, 30, 32 and 36, 38, 30, 32, respectively), in which a pump (26, 36) brings a cooling liquid to cool the respective container. The liquid is cooled in a radiator (32) arranged on the refrigerator. The cooling circuit is only partly filled with the cooling liquid so that the liquid returns to a level (40) below the container when the cooling liquid circulation is shut off.

5 Claims, 2 Drawing Sheets

REFRIGERATOR WITH INTERMITTENTLY WORKING SORPTION REFRIGERATING APPARATUS

BACKGROUND OF THE INVENTION

The invention relates to a refrigerator with a refrigerating unit having at least one pair of containers, where each pair comprises a first and a second container communicating with each other through a conduit and each container containing a substance which, when heated, gives off a gaseous working medium and when cooled, absorbs the gaseous working medium. In such a unit the first container is arranged to be heated from the storage compartment of the refrigerator, which compartment thereby is cooled, and the second container is provided with a heating means. Each container is also provided with means for conducting heat away from the container, when necessary.

Such a refrigerator is known, as shown by U.S. Pat. No. 1,972,427. Its containers, which are arranged inside the outer walls of the refrigerator, are directly cooled by ambient air. As a consequence of the placing of the containers, the ambient air has difficulties reaching them, reducing the cooling of the containers.

The object of the invention is to bring about a refrigerator of the above-mentioned kind, wherein cooling of the containers is substantially improved by the containers being cooled by a liquid, but does not have the drawback that this liquid steals from the energy which is used when the containers are heated.

SUMMARY OF THE INVENTION

The object of the invention is obtained by the refrigerator according to the invention wherein means for conducting heat away from at least one of the containers is constituted by a cooling circuit, in which, when the need arises, a pump supplies a cooling liquid to the container. The cooling liquid is cooled in a radiator arranged on the refrigerator. The cooling circuit is only partly filled with the cooling liquid, so that the liquid returns to a level below the container when the cooling liquid circulation or supply pump is shut off.

BRIEF DESCRIPTION OF THE DRAWING FIGURES

Embodiments of different refrigerators with refrigerating units according to the invention are described below in connection with the enclosed drawings, in which FIG. 1 shows a sectional view of a refrigerator cabinet having the refrigerating unit arranged in the rear wall of the cabinet, FIG. 2 shows a sectional view according to the marking II—II in FIG. 1 with, for the sake of clarity, the refrigerating unit unfolded 180 degrees and showing an electric heating element for heating one of two containers comprised in the refrigerating unit, and two pumps for circulating a cooling liquid through a radiator, FIG. 3 shows the same refrigerator as FIGS. 1 and 2 but with a burner for heating the container, FIG. 4 shows the same refrigerator as FIGS. 1 and 2 but with one pump and two valves for circulating the cooling liquid through the radiator, FIG. 5 shows a sectional view of another embodiment of the refrigerator, FIG. 6 shows a sectional view according to the marking VI—VI in FIG. 5 with, for the sake of clarity, the refrigerating unit unfolded 180 degrees, and where the refrigerating unit shows four containers.

DETAILED DESCRIPTION OF THE PREFERRED EMBODIMENT

Figure 2:
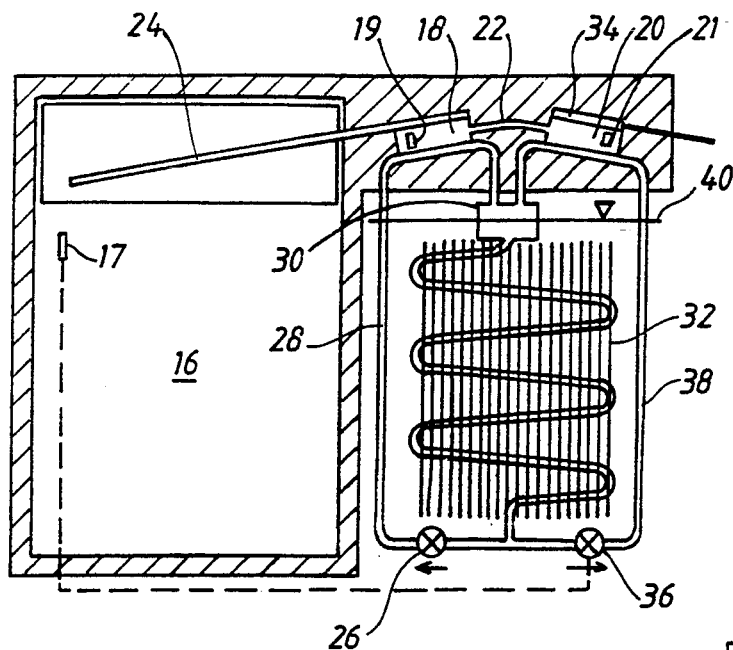
Figure 1:
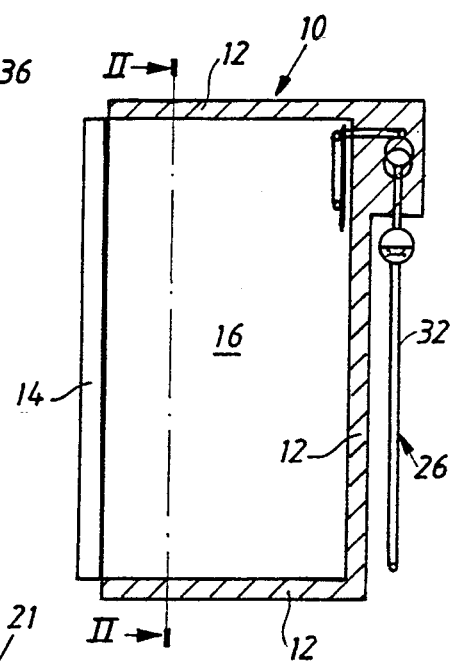

With reference to the drawing figures, a refrigerator 10 comprising heat insulating walls 12 and a door 14 enclosing a storage compartment 16 is shown. A first container 18 and a second container 20, which communicate with each other through a pipe 22, are embedded in the insulation of the rear wall of the cabinet. The container 18 is in heat-conductive contact with the compartment 16 by a so-called "heat-pipe" 24, i.e. a hermetically closed condensation-evaporation tube filled with a refrigerant. The heat pipe 24 can conduct heat from the compartment 16 to the container 18 but not in the opposite direction. The container 18 is also in heat-conductive contact with a liquid cooling circuit comprising a circulation pump 26, a conduit 28 in heat conductive contact with the container 18, a collecting vessel 30 and an air-cooled radiator 32 arranged on the rear side of the refrigerator 10.

The container 20 is arranged to be heatable by an electric heating element 34 and is also in heat-conductive contact with a liquid cooling circuit comprising a circulation pump 36, a conduit 38 in heat-conductive contact with the container 20, the collecting vessel 30 and the radiator 32. The cooling circuits are not completely filled with liquid, therefore, the liquid level will sink to a level 40, when the pumps 26 and 36 are shut off, whereby the thermal contact or connection between the containers and the cooling liquid will be broken. A temperature sensing means 19 senses the temperature in the container 18 and another temperature sensing means 21 senses the temperature in the container 20.

The containers 18 and 20 are filled with substances which give off a gas under heat absorption and absorb the gas under heat rejection. Such substances and gases and their use in refrigeration context are known in the art and more thoroughly described in EP-A-425 368. It is therefore unneeded to describe them further.

The operation of the refrigerator will be described hereafter with reference to the foregoing description and drawing figures. When the temperature in the container 18 has risen to a certain level, temperature sensing means 19 gives a signal which stops the pump 36, activates the heating element 34, and starts the pump 26. During this first period, the container 20 is thus heated by the heating element 34 and the pump 26 circulates the cooling liquid past the container 18 and cools it. The gas is driven out of the container 20 and into the container 18 and is absorbed therein. During this period the heat pipe 24 is inactive as a heat conductor. When the temperature in the container 20 has risen to a certain level the temperature sensing means 21 gives a signal which shuts off the heating element 34 and the pump 26 and starts the pump 36. During this second period the pump 36 thus circulates the cooling liquid past the container 20 and cools it. The container 20 draws gas from the container 18 which in turn, takes heat from the compartment 16 via the heat pipe 24, the compartment 16 thereby becoming refrigerated. Thereafter, the first and second periods are repeated, etc. The compartment 16 is thus refrigerated only during the second period. During the first period the heat insulating walls 12 keep the compartment 16 cold.

A temperature sensing means 17 senses the temperature in the compartment 16. When the temperature in the compartment 16 during said second period sinks below a certain level, temperature sensing the means 17 gives a signal which shuts off the pump 36, preventing further cooling of the container 20 and causing the temperature in the containers 18 and 20 and in the heat pipe 24, and by that the temperature in the compartment 16, to rise. When the temperature in the compartment 16 has risen to a certain level, the temperature sensing means 17 senses this and gives a signal which starts the pump 36 again. In this way one can maintain the temperature in the compartment 16 within a predetermined range.

Figure 3:
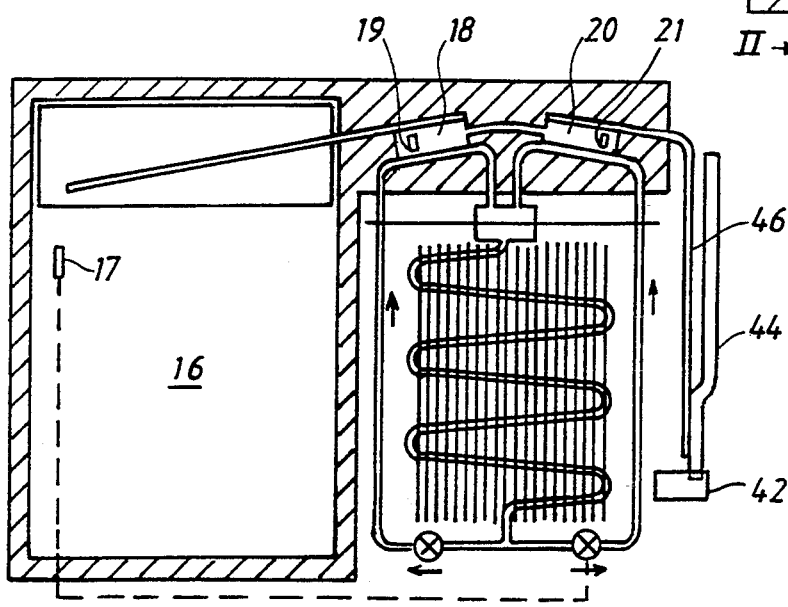

In FIG. 3 is shown how the container 20 can be heated by a gas burner 42. The gas burns in a funnel 44 which is in heat conductive contact with a heat pipe 46 transferring the heat to the container 20. In this embodiment, the temperature sensing means 19 and 21 activate and shut off the burner 42 instead of the heating element 34.

Figure 4:
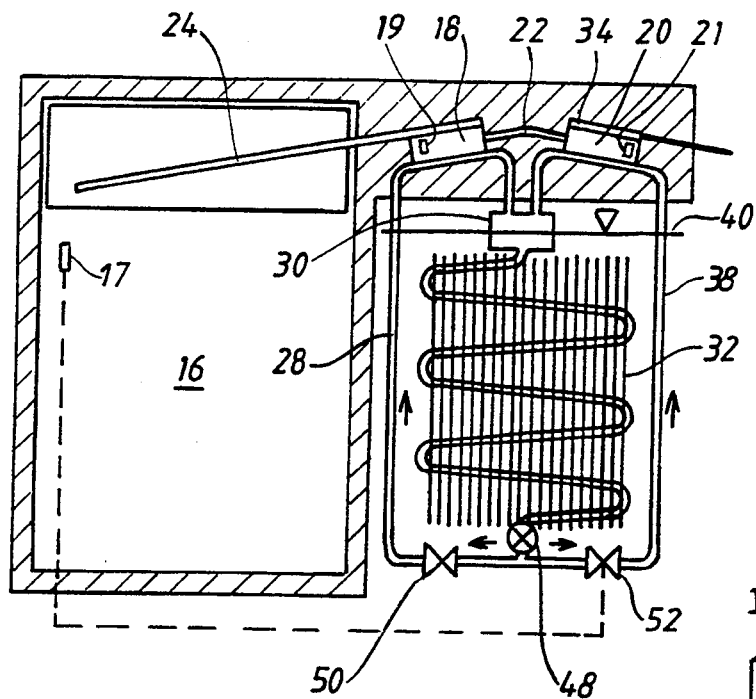

In the embodiment shown in FIG. 4, the desired circulation of the cooling liquid is obtained by a pump 48 and two valves 50 and 52, respectively. The first period begins, when the temperature sensing means 19 senses that the temperature in the container 18 has risen above a certain level. The temperature sensing means 19 then gives a signal which activates the heating element 34, stops the pump 48 so that the liquid in the conduit 38 sinks to the level 40, closes the valve 52, starts the pump 48 and opens the valve 50. The container 18 is cooled by the pump 48 while the container 20 is heated. The second period begins when the temperature sensing means 21 senses that the temperature in the container 20 has risen above a certain level. The temperature sensing means 21 then gives a signal which shuts off the heating element 34, stops the pump 48 so that the liquid in the conduit 28 sinks to the level 40, closes the valve 50, starts the pump 48 and opens the valve 52. The container 20 is thus cooled by the pump 48.

During the second period the temperature in the compartment 16 is controlled whereby the temperature sensing means 17, at a certain lower temperature in the compartment 16, gives a signal, which closes the valve 52 and at a certain higher temperature, gives a signal which opens the valve 52. Before the valve 52 is closed, the temperature sensing means 17 sends a signal that stops the pump 48 so that the liquid in the conduit 38 sinks to the level 40.

Figure 5:
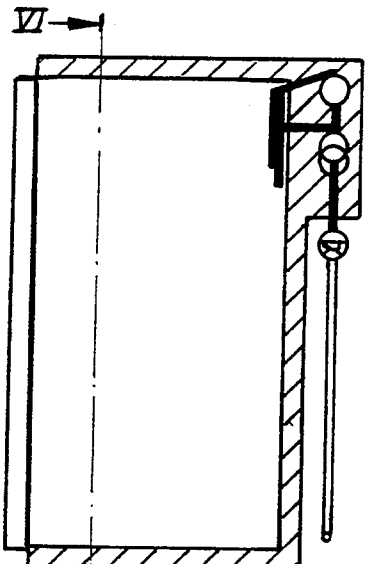
Figure 6:
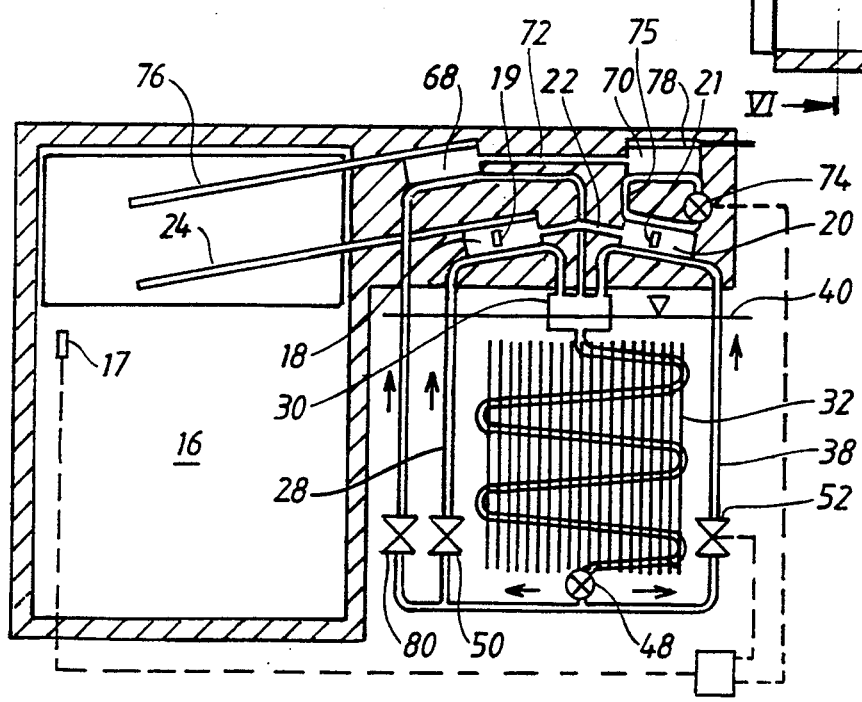

In FIGS. 5 and 6 the refrigerating unit is provided with two additional containers 68 and 70 communicating with each other through a pipe 72. The containers 68 and 70 are filled with substances giving off a gas under heat absorption and absorbing the gas under heat rejection. The object of the containers 68 and 70 is to generate cold in the compartment 16 during the period when the containers 18 and 20 do not generate any cold in the compartment 16.

The operation of the refrigerator shown in FIGS. 5 and 6 will hereafter be described: The first period begins when the temperature sensing means 19 senses that the temperature in the container 18 rises above a certain level. The temperature sensing means 19 then gives a signal which (the pump 48 is in operation) opens the valve 50, closes the valve 52, closes a valve 80, starts a pump 74 and shuts off an electric heating element 78, the container 20 thereby being heated by the container 70 by a pump 74 circulating a liquid through a conduit 75 which transfers heat from the container 70 to the container 20. The pump 48 circulates the cooling liquid past the container 18 and cools it. Gas is driven out of the container 20 to the container 18 and is absorbed in the latter. During the first period the heat pipe 24 is inactive as generator of cold in the compartment 16. During the first period a heat pipe 76 is, however, active as generator of cold in the compartment 16. The heat pipe 76 conducts heat to the container 68 from the compartment 16, the heat drives out the gas from the container 68 through the pipe 72 to the container 70, which is cooled by giving off heat to the container 20. The second period begins when the temperature sensing means 21 senses that the temperature in the container 20 rises above a certain level. The temperature sensing means 21 then gives a signal which (the pump 48 is still in operation) activates the heating element 78, shuts off the pump 74, opens the valve 52, closes the valve 50 and opens the valve 80. By the pump 74 being inactive, no heat is transferred from the container 70 to the container 20. The valve 52 is open so that the container 20 is cooled. The container 20 draws gas from the container 18 which, in turn, takes heat from the compartment 16 via the heat pipe 24, the compartment 16 thereby becoming refrigerated. During this second period the container 70 is heated by the electrical heating element 78 and the container 68 is cooled by cooling liquid circulated by the pump 48 through the valve 80 and a conduit 82. The gas is driven out of the container 70 and into the container 68 and is absorbed in the latter. During the second period the heat pipe 76 is inactive as a heat conductor.

According to the embodiment shown in FIGS. 5 and 6, the temperature in the compartment 16 is controlled during the first period by the temperature sensing means 17 at a certain lower temperature in the compartment 16 giving a signal which shuts off the pump 74, the cooling of the container 70 thereby stopping and the temperature of the heat pipe 76 rising. When the temperature in the compartment 16 then has risen to a certain higher level, the temperature sensing means 17 senses this and activates the pump 74 again. During the second period, the means 17 controls the temperature in the compartment 16 by closing and opening the valve 52 in the same way as has been described in connection with FIG. 4. In the embodiment according to FIGS. 5 and 6 the pump 48 is stopped before any of the valves 50, 52 and 80 are closed, so that the liquid in the corresponding conduits 28, 38 and 82, respectively, sinks to the level 40 and by that the thermal contact with the respective container is broken.

Examples of substances and working media which can be used in the containers:

Working medium for all of the containers: $NH_3$.

Substance in the containers 18 and 68: $BaCl_2$.

Substance in the containers 20: $ZnCl_2$, which absorbs the working medium at a higher temperature than $BaCl_2$.

Substance in the container 70: $NiCl_2$, which absorbs the working medium at a higher temperature than $ZnCl_2$.

I claim:

1. Refrigerator with a refrigerating unit in the form of an apparatus having a first and a second container (18 and 20, respectively; 68 and 70, respectively) communicating with each other through a conduit (22; 72), each container containing a substance which, when being heated, gives off a gaseous working medium and, when being cooled, absorbs the gaseous working medium, the first container (18; 68) being arranged to be heated from a storage compartment (16) of the refrigerator to thereby cool the compartment, the second container (20; 70) being provided with a heating means (34, 46, 75; 78), and each container being provided with means for, when need arises, conducting heat away from the container, wherein the means for conducting heat away from at least one of the containers is constituted by a cooling circuit (26, 28, 30, 32; 48, 50, 28, 30, 32; 48, 50, 28, 80, 82, 30, 32 and 36, 38, 30, 32; 48, 52, 38, 30, 32, respectively), in which a pump (26, 36) brings a cooling liquid to cool the container, said liquid being cooled in a radiator (32) arranged on the refrigerator, said cooling circuit being only partly filled with the cooling liquid so that the liquid returns to a level (40) below the container when circulation of the cooling liquid is discontinued.

2. Refrigerator according to claim 1, wherein the cooling circuit includes two pumps (26, 36) for circulating the cooling liquid to the container and through the radiator (32).

3. Refrigerator according to claim 1, wherein the cooling circuit includes one pump (48) and two valves (50, 52) for circulating the cooling liquid to the container and through the radiator (32).

4. Refrigerator according to any one of claims 1-3, further comprising means (17) for sensing the temperature in the compartment (16) and operable to interrupt conduction of heat away from the second container (20; 70) when the temperature in the compartment falls below a certain level.

5. Refrigerator according to claim 4, wherein the temperature sensing means (17) are adapted to re-establish the conduction of heat away from the second container (20; 70) when the temperature in the compartment rises above a certain level.

* * * * *